United States Patent
Jaisinghani

(10) Patent No.: US 9,201,557 B2
(45) Date of Patent: Dec. 1, 2015

(54) EXTENSIBLE FRAMEWORK TO SUPPORT DIFFERENT DEPLOYMENT ARCHITECTURES

(75) Inventor: Devendra Rajkumar Jaisinghani, Dublin, CA (US)

(73) Assignee: eBay Inc., San Jose, CA (US)

( * ) Notice: Subject to any disclaimer, the term of this patent is extended or adjusted under 35 U.S.C. 154(b) by 984 days.

(21) Appl. No.: 12/718,924

(22) Filed: Mar. 5, 2010

(65) Prior Publication Data

US 2011/0029673 A1   Feb. 3, 2011

Related U.S. Application Data

(60) Provisional application No. 61/230,584, filed on Jul. 31, 2009.

(51) Int. Cl.
*G06F 15/173* (2006.01)
*G06F 3/048* (2013.01)
*H04L 12/24* (2006.01)

(52) U.S. Cl.
CPC .............. *G06F 3/048* (2013.01); *H04L 41/12* (2013.01); *H04L 41/145* (2013.01)

(58) Field of Classification Search
CPC ..................................................... G06F 3/048
USPC ........................... 709/219, 220, 226; 717/100
See application file for complete search history.

(56) References Cited

U.S. PATENT DOCUMENTS

| | | | |
|---|---|---|---|
| 5,996,012 A * | 11/1999 | Jarriel | 709/226 |
| 6,148,335 A | 11/2000 | Haggard et al. | |
| 6,434,598 B1 * | 8/2002 | Gish | 709/203 |
| 6,742,015 B1 * | 5/2004 | Bowman-Amuah | 718/101 |
| 7,340,520 B1 | 3/2008 | Jordan et al. | |
| 8,271,605 B2 * | 9/2012 | Torrant et al. | 709/213 |
| 2003/0004744 A1 | 1/2003 | Greene et al. | |
| 2004/0054790 A1 | 3/2004 | Himmel et al. | |
| 2004/0103173 A1 | 5/2004 | Donatelli et al. | |

(Continued)

FOREIGN PATENT DOCUMENTS

| | | |
|---|---|---|
| CN | 102576354 A | 7/2012 |
| DE | 112010003144 T5 | 7/2012 |

(Continued)

OTHER PUBLICATIONS

"International Application Serial No. PCT/US2010/044003, International Preliminary Report on Patentability mailed Oct. 5, 2011", 26 pgs.

(Continued)

*Primary Examiner* — David Lazaro
*Assistant Examiner* — Marie Georges Henry
(74) *Attorney, Agent, or Firm* — Schwegman Lundberg & Woessner, P.A.

(57) ABSTRACT

A method for managing services and resources across a plurality of deployment architectures is described. The method begins by defining a profile corresponding to a deployment architecture. Each profile is defined according to a meta-model. The meta model comprises a service object representing a service that is accessible over a network, resource objects representing resources consumed by the service, inter-relationships between the service and resources, inter-relationships between the resources. For each profile, a topology is generated based on the profile. The topology includes the resources used to perform a task.

25 Claims, 10 Drawing Sheets

(56) References Cited

U.S. PATENT DOCUMENTS

| | | | |
|---|---|---|---|
| 2004/0199572 A1* | 10/2004 | Hunt et al. | 709/201 |
| 2004/0225952 A1 | 11/2004 | Brown et al. | |
| 2005/0198247 A1 | 9/2005 | Perry et al. | |
| 2006/0059253 A1 | 3/2006 | Goodman et al. | |
| 2006/0294238 A1 | 12/2006 | Naik et al. | |
| 2007/0174036 A1 | 7/2007 | Schmidt et al. | |
| 2008/0037532 A1 | 2/2008 | Sykes et al. | |
| 2008/0320482 A1 | 12/2008 | Dawson et al. | |
| 2009/0083717 A1 | 3/2009 | Branson et al. | |
| 2009/0171730 A1 | 7/2009 | Bobak et al. | |
| 2009/0276771 A1* | 11/2009 | Nickolov et al. | 717/177 |

FOREIGN PATENT DOCUMENTS

| | | | |
|---|---|---|---|
| WO | WO-2011014827 A1 | 2/2011 | |
| WO | WO-2011014830 A1 | 2/2011 | |
| WO | WO-2011014835 A1 | 2/2011 | |

OTHER PUBLICATIONS

"International Application Serial No. PCT/US2010/044009, International Search Report mailed Sep. 27, 2010", 8 pgs.

"International Application Serial No. PCT/US2010/044015, International Preliminary Report on Patentability mailed Feb. 9, 2012", 7 pgs.

"International Application Serial No. PCT/US2010/044015, International Search Report mailed Oct. 4, 2010", 2 pgs.

"International Application Serial No. PCT/US2010/044015, Written Opinion mailed Oct. 4, 2010", 5 pgs.

"International Application Serial No. PCT/US2010/44003, International Search Report mailed Sep. 23, 2010", 2 pgs.

"International Application Serial No. PCT/US2010/44003, Written Opinion mailed Sep. 23, 2010", 7 pgs.

"International Application Serial No. PCT/US2010/44009, International Preliminary Report on Patentability mailed Nov. 4, 2011", 5 pgs.

"Chinese Application Serial No. 201080044371.X, Office Action mailed Jan. 8, 2014", with English translation of claims, 21 pgs.

"Chinese Application Serial No. 201080044371.X, Office Action mailed Sep. 18, 2014", with English machine translation, 19 pgs.

"Chinese Application Serial No. 201080044371.X, Response filed May 23, 2014", with English translation of claims, 16 pgs.

"German Application Serial No. 112010003144.4, Response filed Sep. 4, 2014", with English machine translation, 38 pgs.

"German Application Serial No. 112010003144.4, Office Action mailed May 8, 2014", with English translation of claims, 14 pgs.

Feridun, Metin, et al., "Implementing OSI Agent Managers for TMN", IEEE Communications Magazine, (Sep. 1996), 62-67.

Tonouchi, Toshio, et al., "An Implementation of OSI Management Q3 Agent Platform for Subscriber Networks", IEEE International Conference, (1997), 889-893.

* cited by examiner

EXTENSIBLE FRAMEWORK TO SUPPORT DIFFERENT DEPLOYMENT ARCHITECTURES

CROSS-REFERENCE

This application claims the priority benefit of U.S. Provisional Application No. 61/230,584, filed Jul. 31, 2009 and entitled "Management of Services and Resources," which is incorporated herein by reference.

FIELD

The present application generally relates to management of services and resources in a datacenter or cloud computing environment and, in one specific example, to an extensible framework to support different deployment architectures.

BACKGROUND

In a data center environment, there exist many services to accomplish business objectives or to support other services. In some contexts, these services may include trading (sell item, view item for sale, etc.), messaging, and search. All of the services consume hardware and software resources. Examples of hardware resources include compute (servers), network (switches, load balancers, firewalls, etc.), storage (SAN, NAS, etc.), and those for the latter include operating system, application platform stack (java virtual machine, tomcat servlet container, etc.), and database. These hardware and software resources are arranged in different configurations depending on the requirements of the particular service. The configurations are referred to as "deployment architectures." Examples of deployment architectures include the traditional 3-tier architecture (web tier, app tier, database tier each of which may have load balancer for traffic distribution), a messaging infrastructure, etc. Within these there may be variations, for example, load balancers may be deployed in a pair to provide high availability (HA). Traditionally, there have been management systems for each subset of the data center environment. For example, there are network management systems focused on managing (e.g., configuring, health checking, performance monitoring, etc.) switches. Others focus on applications (e.g., application deployment, etc.). This leads to a proliferation of management systems.

BRIEF DESCRIPTION OF THE DRAWINGS

Some embodiments are illustrated by way of example and not limitation in the figures of the accompanying drawings in which.

DETAILED DESCRIPTION

Figure 1:
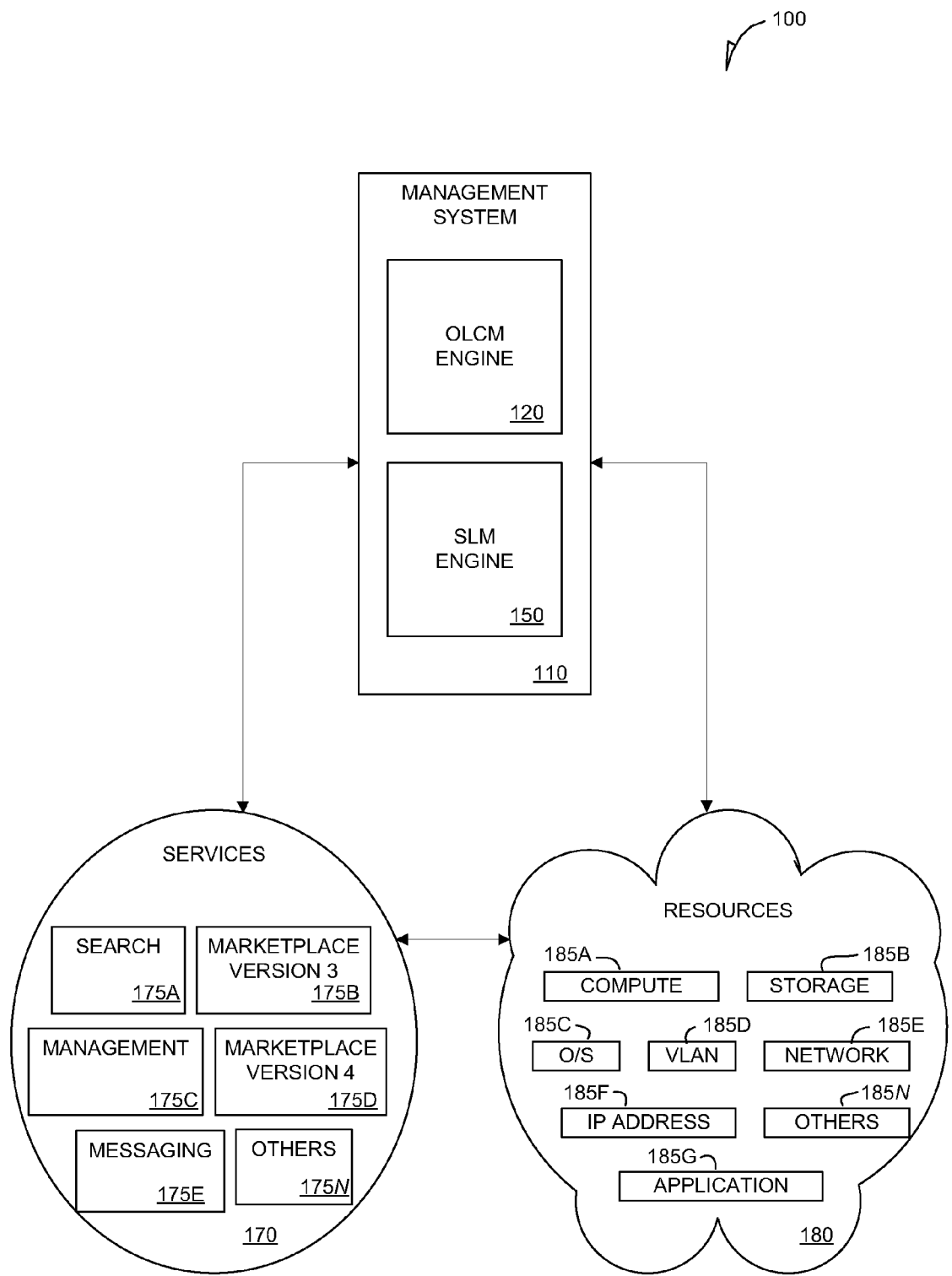
FIG. 1 is a block diagram of a network environment in which various embodiments may be practiced.

Example methods and systems to manage services in a data center environment and resources consumed by the services using an extensible model framework are described. In the following description, for purposes of explanation, numerous specific details are set forth in order to provide a thorough understanding of example embodiments. It will be evident, however, to one skilled in the art that the present invention may be practiced without these specific details. As used herein, the term "or" may be construed in either an inclusive or exclusive sense.

In a large enterprise computing system, services are provided using different systems. Examples of such systems provide trading services, search services, messaging services, payment services, and web publishing services. Because each system performs separate functions, the operation of an enterprise computing system, as a whole, depends on the performance of each of the other systems. This is particularly true where more than one system is used to execute a transaction or "flow." For instance, to complete a sale in an Internet commerce system, the systems corresponding to the search, web publishing, payments, and messaging services may be used at particular times in the flow.

The systems are implemented using one or more resources. The resources may be hardware resources and/or software resources. Examples of hardware resources include servers, routers, load balancers, and the like. Examples of software resources include operating systems, applications, and the like.

In the context of a management system, each managed entity (i.e., a service or a resource) is modeled in terms of its operational configuration, performance, and status (for example, active status). Further, each such modeled entity is related to one or more modeled entities to reflect the real-world relationships. For example, a computer program (an application) runs on an operating system, and therefore the corresponding modeled entities inside the management system also reflect this relationship. The resulting model of modeled entities (each entity consisting of attributes specifying its configuration, performance and status) and their inter-relationships is known as an Information Model. The Information Model is created in a modeling tool and stored in a model repository to be used by, for example, system architects.

Each type of service has a deployment architecture that shows the various constituent resources, their inter-relationships, and their dependencies on other services, if applicable. In the context of a model-driven management system, each service's deployment architecture can be specified in terms of a specific Information Model. In this context, the Information Model is referred to as a deployment profile ("profile"). Thus the profile is used to specify the deployment architecture in terms of its functional and non-functional criteria. To illustrate, the simplest profile may be "N number of servers" where the servers may be contiguously assigned. Another profile may correspond to the traditional 3-tier architecture consisting of load balancers, servers to be used as web servers, servers to be used as application servers, servers to be used as database servers, and a layer-3 switch to provide LAN switching and layer-3 routing between VLANs. The three types of servers may have different capabilities (e.g., database servers may be big-iron boxes and the web servers may be blade servers or even virtual machines). Other variations may result in a different profile, for example, load balancers may be arranged in an active-active (or active-passive) configuration to provide high availability.

Yet another profile may use the 3-tier profile to generate a profile of another service. For example, a profile may specify that the web server (software) is to be deployed on tier-1 servers, that application servers (software) are to be deployed on tier-2 servers, and that a database is to be deployed on tier-3 servers, and so on. In these profiles, the application code to be deployed in the application servers may depend on other services (for example, a logging service).

Figure 10:
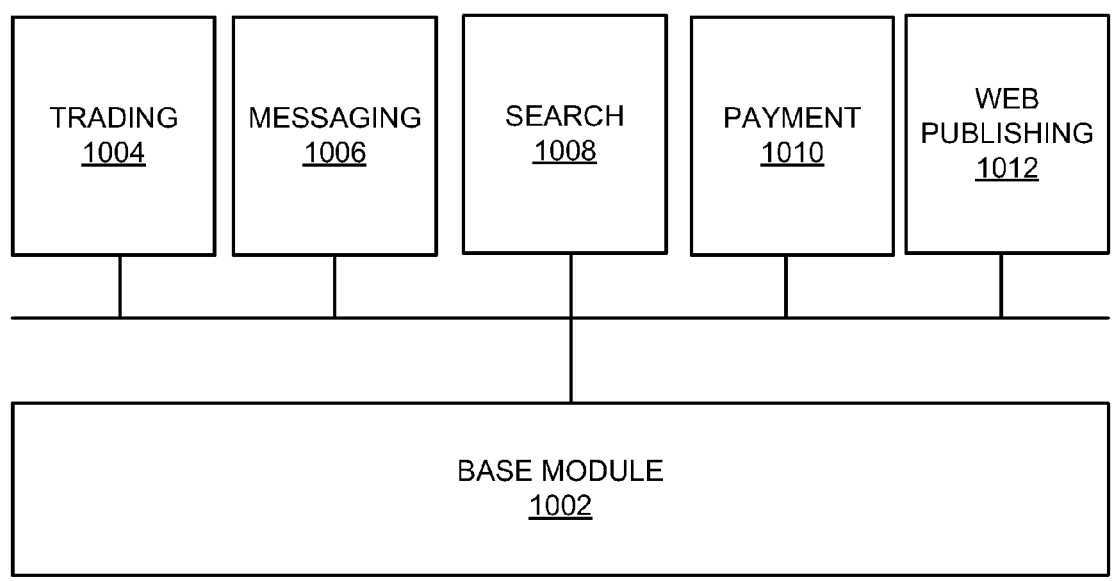
FIG. 10 is a block diagram of an Information Model structured in two layers according to some embodiments.

The various deployment architectures in a data center or cloud computing environment have many common resource types such as servers, load balancers, operating systems, etc. To allow a single management system to understand multiple deployment architectures, the common resource type definitions are reused between profiles. This is done by structuring the Information Model in two layers as shown in FIG. 10. The Base Module 1002 provides the definitions for common resource types such as servers, operating systems, etc. whereas the top layer provides the definitions for resource and service types that are specific to a particular service such as trading 1004, messaging 1006, search 1008, payment 1010, and web publishing 1012. A profile is then constructed by incorporating the service and resource types in a particular domain along with the types in the Base Module 1002.

When a service is to be deployed, its deployment configuration is specified in terms of number and type of resources, configuration parameters of resources individually and/or by type, and then suitable resource instances are identified and allocated. Doing so allows the management system to automate the deployment and other life cycle management tasks. In the context of the present invention, such information is captured in a specification called a deployment topology (henceforth called a topology). A topology is a realization of a profile. The specification of a topology progresses in two stages—logical and physical. A logical topology specifies the abstract types of resources and their cardinalities (e.g., 10 blade servers) and a physical topology specifies both the concrete types of resources and their specific instances (e.g., IBM LS 20 blade server with asset id 54321abcde).

The management system manages services corresponding to different profiles, allows introduction of new profiles, and therefore manages new services as a data center or a cloud computing environment evolves. Further, it does so without modifying the subsystems of the management system or to redeploy the management system or to restart a running management system. These objectives may be achieved by providing a generic Service Manager, a meta-model, and a plugin framework.

A Service Manager is responsible for the complete life cycle and service level management of a service. Examples of life cycle operations include deployment, configuration, start, activate, update, etc. and these operations can be carried out on the service as a whole or on specific or grouped resources that are used by the service. Each instance of a Service Manager can manage multiple service instances conforming to the same profile. The specificity is in the Controllers that are specific to an abstract resource type (e.g. load balancer) and in the Adaptors that are specific to a concrete resource type (e.g. Citrix NetScaler load balancer). When the service is first deployed, the Service Manager parses the topology and dynamically loads the corresponding Controllers and associated Adaptors for each unique service and resource specified.

Each Controller within a Service Manager manages multiple instances of the same service or resource type since it is defined per abstract type. For example, a single load balancer controller is used to manage all the load balancers in the service regardless of the particular make or model of load balancer used. Adaptors are specific to concrete types (e.g., a particular make or model) and translate the generic commands to commands specific to the implementation. For example, there is a NetScaler load balancer adaptor, a F5 BigIP load balancer adaptor, and so on. As such to introduce support for a Zeus load balancer, only its adaptor is provided. To introduce a new type, for example, an SSL accelerator, its controller and adaptors for the concrete types (e.g. adaptor for Coyote Point's SSL accelerator) is provided. The examples cited above are hardware specific, but the concept is applicable to software types as well.

The Information Model elements corresponding to various resource and service types and the associated management semantics are confined to the Controllers and Adaptors inside a Service Manager. The rest of the management system (including Service Manager Components other than Controllers and Adaptors) operates at a higher level of abstraction of the Information Model. This abstraction is referred to as a meta-model. Since the subsystems are to operate at the level of the meta-model, they are unaffected by the changes made in an existing profile or by the introduction of a new profile as long as the profile conforms to the meta-model. Thus, using a meta-model allows the management of new services whose profiles may perhaps contain new model elements (e.g. a new type such as an SSL accelerator).

The meta-model defines the following eight meta-objects: Service, Resource, Part, Configuration, Performance, Capability, Group, and Application Data. A Resource meta-object also has sub-types. The meta-model also specifies the relationships between these meta-objects. Each type in a profile is classified (i.e., sub-typed) as one of the meta-objects. For example, each resource in a profile is sub-typed as one of the Resource sub-types in the meta-model. As a concrete example, load balancer, switch, router, firewall are sub-typed from Network Element that, in turn, is sub-typed from Hardware Resource. The Hardware Resource is, in turn, sub-typed from a Resource. To introduce a new entity, for example, an SSL accelerator, the new entity may be derived from a Network Element (which by generalization also makes it a Hardware Resource and a Resource).

The meta-model can be viewed as a model for creating profiles. A user or domain expert (e.g. Application Architect) wishing to introduce management capabilities for a new service can inspect the model repository and choose from the available resource types, and create (if needed) new resource or service types specific to his domain. The newly created types are sub-classed from the existing meta-objects or sub-types. Next, the domain expert can create the appropriate relationships and cardinalities between the various service and resource types and thereby create a new profile. This profile is then versioned and stored in the management system.

For the management system to use the configuration, cardinality, resource binding, and relationship information as specified in the topology, the management system creates a programmatic representation of the types internally. This is done so by creating class definitions from the profile. When a topology is specified as an input, the management system can generate the corresponding objects from which the said information can be obtained. In one example implementation, the profile may be represented by XML Schema and the topology by an XML instance document. Then using JAXB framework, the Java class representations may be generated and, at runtime, the topology may be parsed to create the corresponding Java objects.

A plugin framework is provided which enables the management system to dynamically load capabilities to manage new services with possibly new deployment architectures. Specifically, the plugin framework allows bundling of class representations of the model elements in the profile, and the corresponding controllers and adaptors as needed, into a library. The library so created is called a plugin, and using the plugin framework, it is stored in the management system. The classes and the plugin are versioned to prevent dynamic class/library loading errors. The plugin framework maintains a mapping between the [profile name, profile version] 2-tuple and the [plugin name, plugin version] 2-tuple. When a service has to be deployed, the Service Manager inspects the topology metadata wherein the corresponding profile's name and version number are stored. Using this information, the service manager identifies the corresponding plugin with the correct version, and using the available language and operating system facilities dynamically loads it into its address space. All of this is done without having to redeploy the management system or without restarting the running management system. Further, no subsystem modifications need to be made since the rest of the system operates at the level of the meta-model. Thus, using a generic Service Manager, a meta-model, and a plugin framework, extensibility is achieved.

As an example, the search domain experts (or "search team"), instead of developing their own management system to manage the search infrastructure (comprised of multiple services and resources), can leverage the framework capabilities of the extensible model (monitoring, configuration management, resource management, etc.) and add only those pieces that are specific to the search domain. More specifically, the search team may build their profiles reusing the definitions of server, load balancer, operating system, etc. and introduce new elements, for example, search query node (a software resource). The search team may make their profile (s) in conformance with the meta-model. For new types, the search team may write the relevant controllers and adaptors. The search team may create an appropriate plugin that packages the class definitions of the model elements in the profile, and the relevant controllers and adaptors as needed. The plugin may then be versioned and stored in the management system, and dynamically loaded when the corresponding service has to be deployed.

FIG. 1 is a block diagram 100 of an exemplary infrastructure environment, such as a data center, and is shown to include relationships between services 170, resources 180, and a management system 110. The services 170 can include, for example, search services 175A, version 3 marketplace services 175B, management services 175C, version 4 marketplace services 175D, messaging services 175E, and any other service 175N that utilizes resources and can be managed. The resources 180 can include, for example, computer resources 185A, storage resources 185B, operating system resources 185C, VLAN resources 185D, network resources 185E, IP address resources 185F, application resources 185G, and any other resource 185N that the services 170 may utilize. In an example embodiment, the management system 110 includes an operational lifecycle management (OLCM) engine 120 for, among other things, deploying the services 170 such that they use resources selected from the resources 180. In an example embodiment, the management system 110 also includes a service level management (SLM) engine 150 for, among other things, monitoring the services 170 and the resources 180 and dynamically allocating at least one of the resources 180 such that each of the services 170 maintains a specific service level as defined by key performance indicators (KPIs), such as mean response time or throughput.

In an example embodiment, the services 170 and the resources 180 are coupled to the management system 110 such that the management system 110 can manage the services 170 and the resources 180 using the OLCM engine 120 and the SLM engine 150. In an example embodiment, ones of the services 170 and one or more of the resources 180 are coupled such that one or more of the resources 180 are allocated for ones of the services 170 or ones of the services 170 are deployed such that they use one or more of the resources 180.

Figure 2:
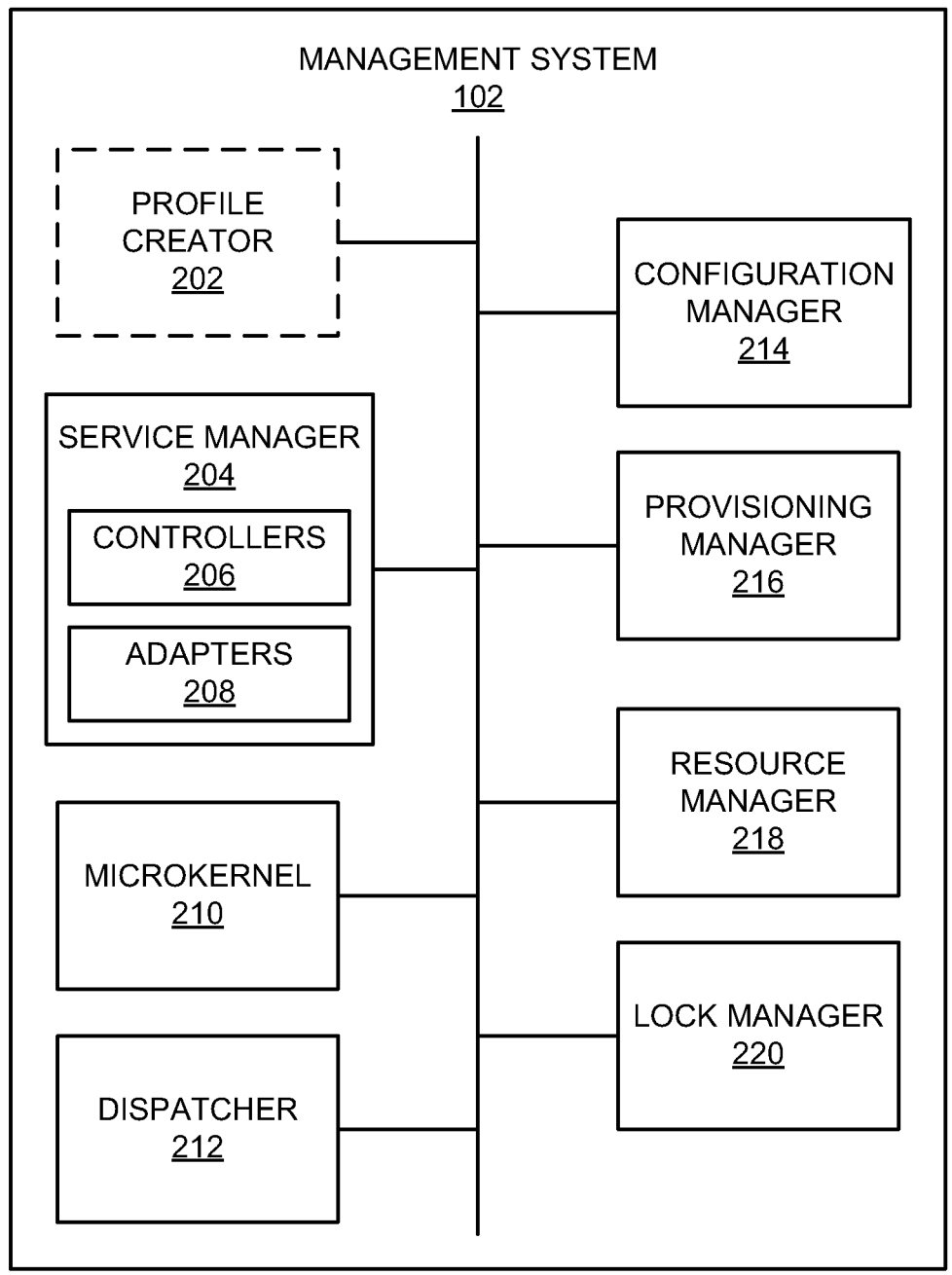
FIG. 2 is a block diagram of a management system according to various embodiments.

FIG. 2 is a block diagram of the management system 102 according to various embodiments. The management system 102 comprises an optional profile creator 202, one or more service managers 204, a microkernel 210, a dispatcher 212, a configuration manager 214, a provisioning manager 216, a resource manager 218, and a lock manager 220. The management system 102 provides operational life cycle management, dynamic resource allocation, and service level management capabilities for the managed services and constituent resources.

Figure 9:
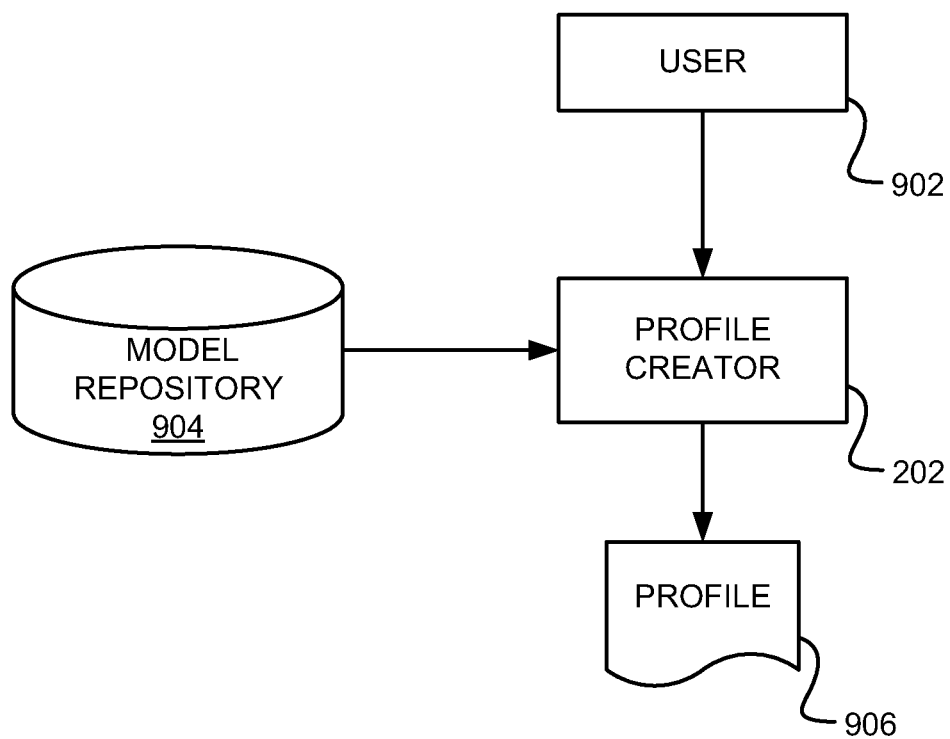
FIG. 9 is a block diagram of a profile creator according to various embodiments.

Referring now to FIG. 9, an example profile creator 202 is depicted. The profile creator 202 may be external to the management system 102 in some instances. The profile creator receives one or more inputs from a user 902 (e.g., a domain expert) and accesses a model repository 904. The model repository 904 stores models and meta-models of services and resources. The user 902 reuses model elements from the model repository 904 as appropriate to the deployment architecture of the service type being created. If new model elements need to be created, the user 902 creates their definitions in the tool. Further, each newly created model element is subclassed from a meta-object or from one of the Resource subtypes as appropriate. Dependency and parent-child relationships between the model elements can be created as needed. If dependencies exist between the target profile and other profiles (that is, the target service type depends upon another service type), such dependencies can also be created. In one example embodiment, the model for the deployment architecture may be created in UML and then the UML representation may be transformed into a XML Schema representation. Subsequently, the XML Schema may be compiled using JAXB to produce the Java class representations. Once the profile is created, it is then exported from the tool and versioned and stored in the management system.

When a new service instance is created and deployed, the user (for example, an Operations Architect) uses a Topology Editor to create the topology. The topology so created is a logical topology. A logical topology indicates abstract types of resources (e.g., "server," "load balancer," "switch," etc.) and how many (e.g., cardinality) of each of the resources to be used. Subsequently, resource bindings are created for the abstract resource in a two-step process—binding the abstract resource type to a concrete resource type (e.g., "NetScaler Load Balancer," "Cisco 3550 Switch," "LS20 Server," etc.), and then binding to an actual resource instance. This results in the creation of a physical topology. In some instances, the management system 102 may lazily bind the concrete resource type to an actual resource instance when the service is deployed.

The service manager 204 manages service and constituent resources according to the profiles within the datacenter 104 or the cloud computing environment 106. More specifically, the service manager 204 provides service level management (SLM) and operational life cycle management (OLCM) for the service and constituent resources. Based on the physical topology, the service manager 204 initiates, manages, and/or terminates execution by the actual resources in the data center 104 and/or the cloud computing environment 106 to provide the service.

The service manager 204 comprises a controller 206 that is specific to a service or resource type. It is responsible for the complete life cycle and service level management of all the service/resource instances under its control. As such, each service manager 204 may include more than one controller 206 for services that consume more than one type of resource.

The service manager 204 further comprises adapters 208 which provide a transformation of commands received from the controller 206 to native commands executable by the concrete resource instance(s). The controller 206 may access a distinct adapter 208 for each concrete resource type. A single adapter may be used to communicate with more than one instance of the same concrete resource type.

The microkernel 210 provides life cycle and service level management for each subsystem (e.g., the service manager 204, the dispatcher 212, the configuration manager 214, the provisioning manager 216, the resource manager 218, and the lock manger 220). It also provides a service registry capability, and a service lookup capability to register and lookup the service endpoints of the subsystems respectively.

The dispatcher 212 serves as the entry point into the management system 102. It receives all client requests, determines the subsystem to which the request is targeted by doing a lookup in the microkernel 210 and then dispatches the request to the target subsystem. It also provides user authentication and authorization for the management system 102, and creates and maintains user sessions. User authentication may be delegated to another server distinct from the management system 102. User authorization may be performed internally based on roles and privileges of a particular user. Upon successful authentication and authorization, a user session is created, and the session persists until a period of time is elapsed or when the user logs out.

The configuration manager 214 may store and/or access existing profiles and/or their corresponding topologies (e.g., logical or physical) stored in a configuration repository. In some instances, the configuration repository may be implemented using a relational database management system (RDBMS) or may be a configuration management database (CMDB).

The configuration manager 214 may operate at the level of the meta-model instead of at the level of the model elements in the profiles in order to maintain independence from individual deployment architectures/models. The configuration manager 214 may transform the topology (stored, for example, as an XML document) into relational database tables based on the corresponding meta-objects. The configuration manger 214 may further create and maintain version vectors for the profiles, topologies (both logical and physical), and individual objects within the topology to allow the management system 102 to roll back (or forward) a service to a previous (or later) version of its deployed topology. The configuration manager 214 may additionally verify the deployed configurations and ensure that there is no configuration drift in the resources. When a configuration drift is detected, the relevant service manager 204 of the affected resource can take appropriate corrective actions.

The provisioning manager 216 is responsible for the deployment of resources including an operating system, application stack (e.g., Java Virtual Machine (JVM), Servlet Container), and application code to compute elements (e.g., servers). Since a variety of specialized products and tools may be available, the provisioning manager 216 provides a service layer to abstract those products and tools using adaptors 208. Examples of such tools include, but are not limited to, Symantec's Altiris for OS deployment and eBay's TurboRoller for application stack and code deployment.

The resource manager 218 is responsible for reserving and allocating actual, concrete resources. Reservations may be leased, that is, the reservations expire if not used by a particular service by a particular time. The reservations may be permanent (or up to a specified maximum duration) by performing a resource allocation based on a service deployment command issued by the user (e.g. a systems administrator). The resource manager 218 may further dynamically assign resources and periodically adjust the resource allocation between services.

The lock manager 220 may operate to prevent concurrent access to a shared resource. In some instances, resources are shared between different services. If multiple service managers 204 access a shared resource concurrently, there is a chance of creating inconsistency in the resource's configuration as not all resources enforce or provide serialized access. Therefore, an out-of-band synchronization or mutual exclusion mechanism can be provided. To access a resource, the service manager 204 first obtains a lock from the lock manager 220 and relinquishes the lock after its session with the managed resource is over. Locks are leased, that is, they expire after a specified duration. A lease may be extended subject to some tunable maximum as needed. Locks are also reentrant and persistent across reboots.

Figure 3:
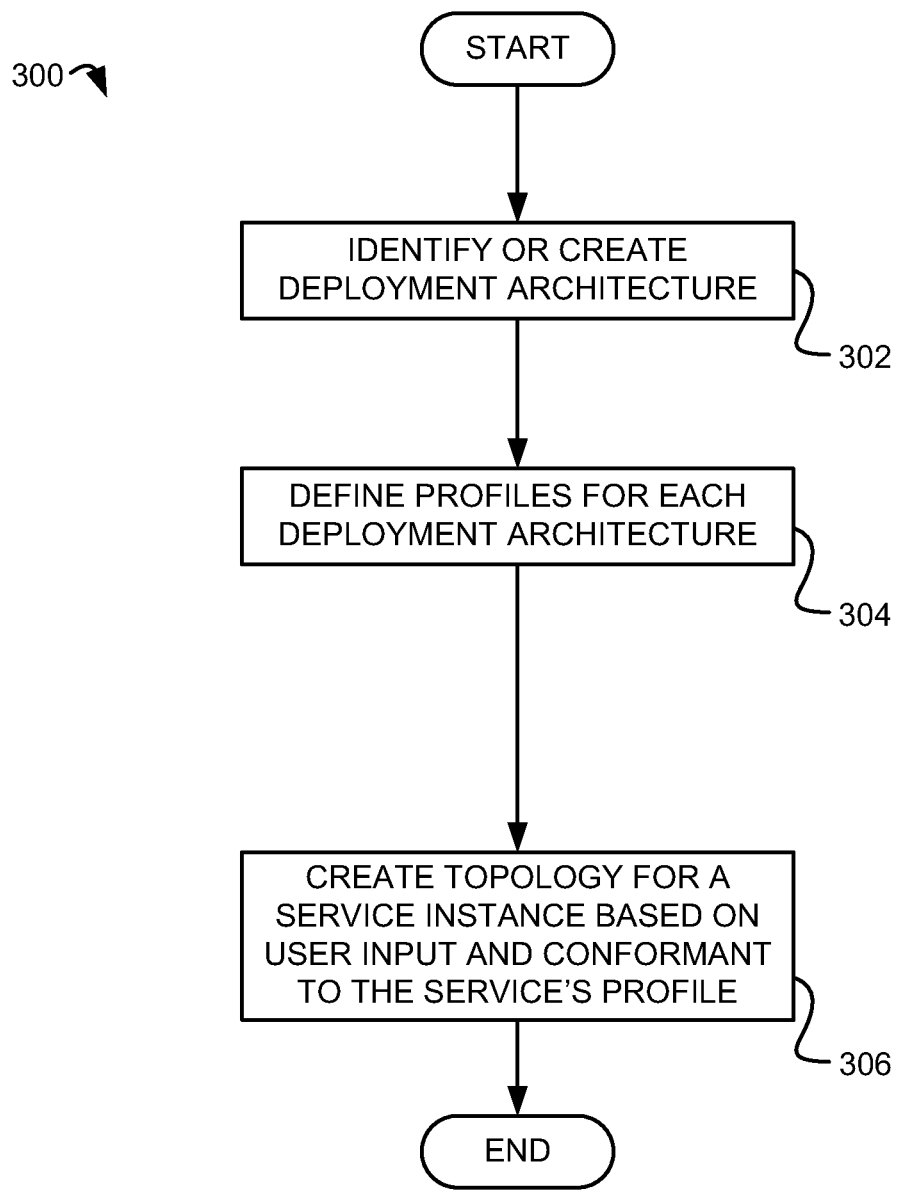
FIG. 3 is a flowchart of a process for using a model framework in domain arrangement according to various embodiments.

FIG. 3 is a flowchart of a process 300 for creating profiles and topologies. Each service (e.g. messaging, or trading, etc.) has its corresponding deployment architecture. The deployment architecture is identified or created in a step 302, and as described above.

However this architecture is not consumable by a software program. So, a profile that is consumable by software is created. The profile is created using the meta-model and the existing model library (the library will contain the base module plus possibly other user-contributed model elements that can be reused) in a step 304. New model elements (usually domain specific) may also be created if needed. The profile is then versioned and stored in the management system.

In a step 306, when a new service instance is to be deployed (e.g. a new instance of the messaging system), its (deployment) topology is created based on the parameters supplied by the user (e.g. number of servers, configuration parameters, etc.) or through some policy. The topology so created is a logical topology. The next step is to do resource bindings as a result of which a physical topology is created. Both logical and physical topology are versioned and stored in the management system (more precisely, in the configuration manager). The topologies can be created visually using a topology editor or programmatically by another program. Once all due approvals are received, the physical topology is deployed (more precisely, it is used by the management system to deploy the service instance).

Figure 4:
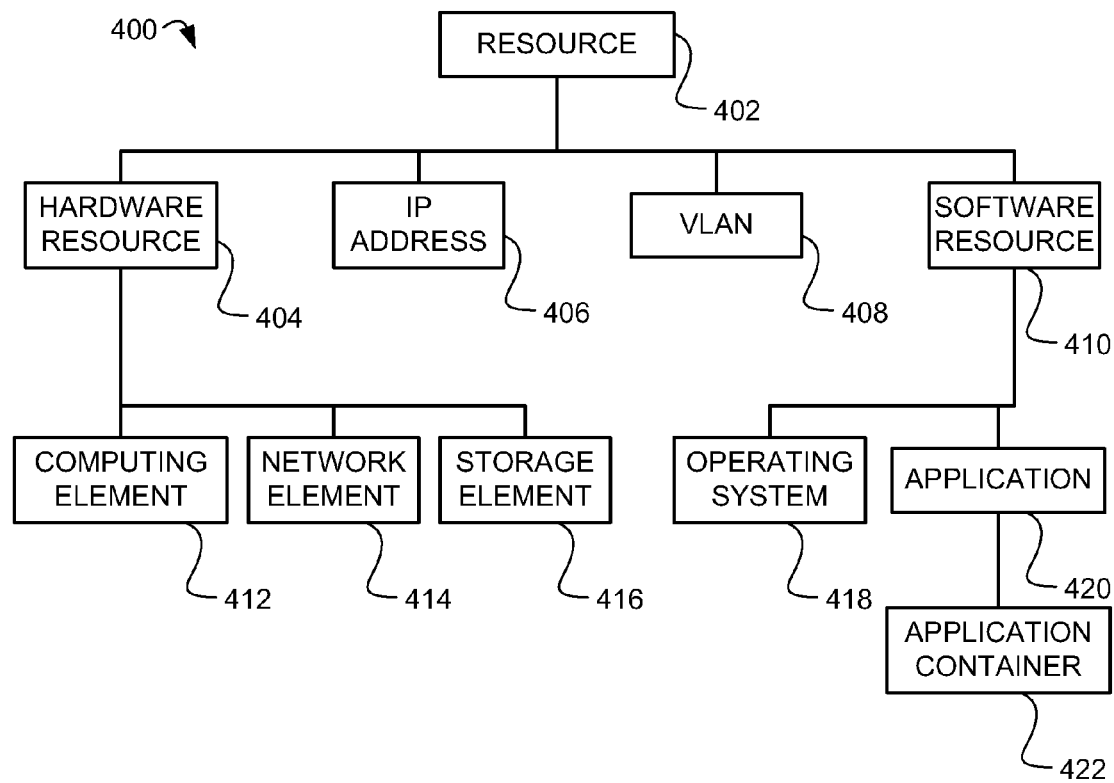
FIG. 4 is a hierarchy of objects within a resource classification according to various embodiments.

FIG. 4 is a hierarchy of objects 400 that is used to classify resources within a meta-model according to various embodiments. The hierarchy is composed generally of different types of resources.

The resource 402 may be classified or subtyped into one or more types of resources. These resources, in the present example of the model, are depicted as a second tier beneath the resource 402, and include hardware resource 404, IP address 406, virtual local area network (VLAN) 406 and software resource 410. The meta-model may allow for additional classification of resources.

The hardware resource 404 and the software resource 410 may, in the meta-model, be further classified into subtypes. These subtypes are depicted in FIG. 4 in the third and fourth tier. These subtypes in FIG. 4 are not intended to be limiting in the meta-model. A hardware resource 404 may be subtyped as a computing element 412 (e.g., a server, a virtual machine, computer, or handheld device), or as a network element 414 (e.g., a router, load balancer, firewall, etc.), or as a storage element 416 (e.g., a memory storage device, optical storage device, a Storage Area Network, a Network Attached Storage, etc.). A software resource 410 may be subtyped as an operating system 418 (e.g. Windows, Linux, etc.) or as an application 420 (e.g. browser or word processing). The application 420 may further be subtyped as an application container 422 (e.g. Java virtual machine, Servlet Container, etc.).

Figure 5:
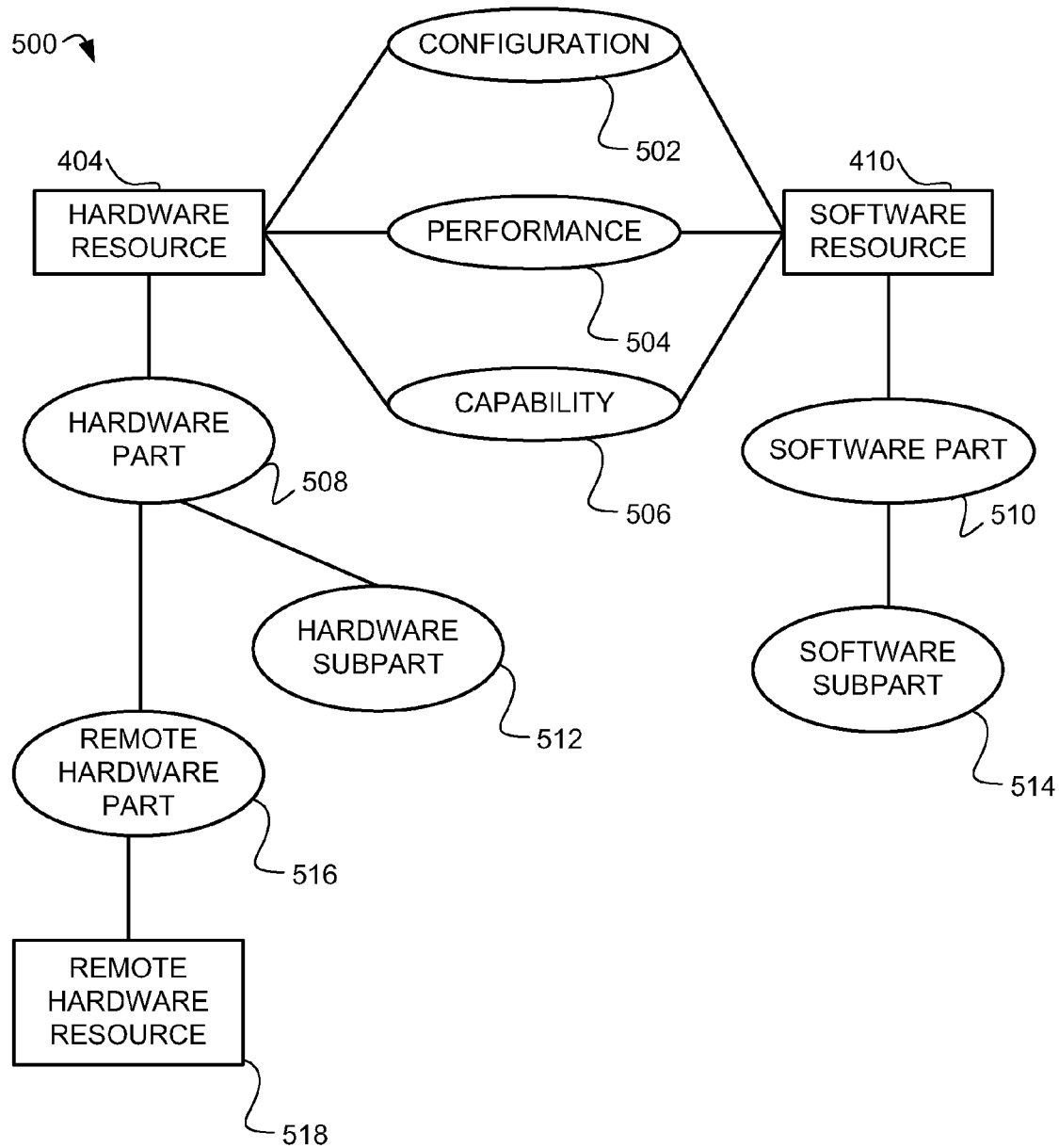
FIG. 5 is a block diagram of a model structure for hardware and software resources according to some embodiments.

FIG. 5 is a block diagram to show the composition of hardware and software resources in a meta-model according to some embodiments. Both hardware resource 404 and software resource 410 have objects that describe their configuration 502, performance 504, and capability 506. Information in the configuration object 502 is used to configure the resource instances. A configuration object 502 may itself be composed out of child configuration objects (not shown). Information obtained by monitoring performance metrics of the corresponding resource instance is stored in the performance object 504. Information stored in the capability object 506 describes the capabilities (e.g. number of CPUs, amount of memory, throughput, response time, etc.) of the resource type. It may be used during automated resource allocation by specifying the capabilities required of a resource type and matching it up with the capabilities provided by an actual concrete type. Both hardware resource 404 and software resource 410 may be built out of hardware part 508 (e.g. network interface card) and software part 510 (e.g. a dynamic linked library) respectively. Each part may also have an associated capability object (not shown). Some parts may themselves be composed out of subparts (hardware subpart 512 and software subpart 514), and so on. A hardware part may be connected to another remote hardware part 516 for accessing a remote hardware resource 518. For example, a network port (hardware part 508) on a server (hardware resource 404) may be connected to another network port (remote hardware part 516) on a network switch (remote hardware resource 518) through an Ethernet cable.

Figure 6:
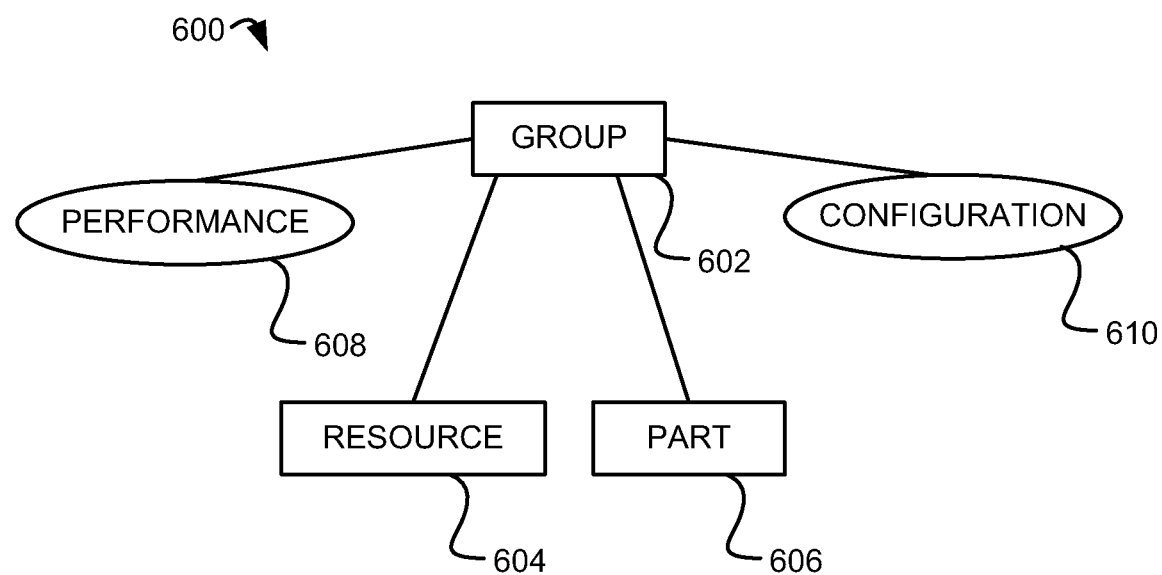
FIG. 6 is a block diagram of a model structure associated with a group according to various embodiments.

FIG. 6 is a block diagram of a model structure 600 associated with a group object 602 in a meta-model according to various embodiments. In some instances, resources 604 (e.g., hardware resource 404 and software resource 412) and/or parts 606 are grouped to enable grouped operations. As examples, servers (which are compute elements) can be grouped into a pool and contiguous IP addresses can be grouped into a subnet. Grouping may be provided via a group object 602. Each group may optionally have an associated configuration object 610 and performance object 608.

Figure 7:
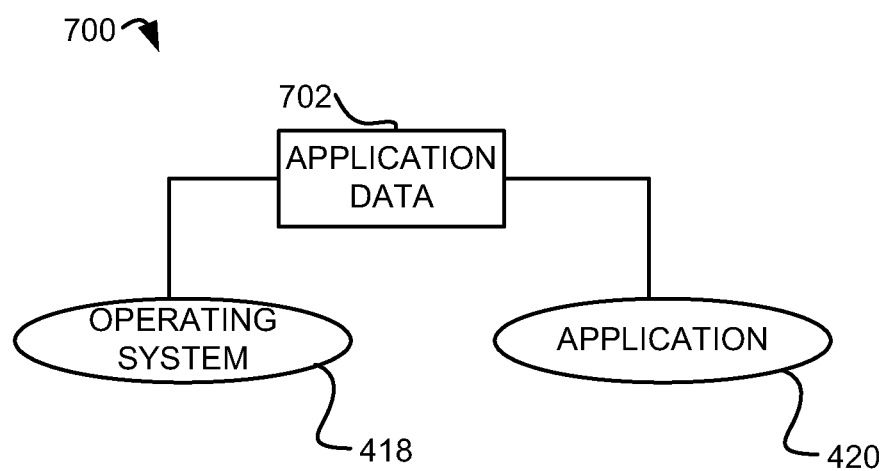
FIG. 7 is block diagram of a model structure for storing data according to various embodiments.

FIG. 7 is block diagram of a model structure 700 for application data 702 in a meta-model according to various embodiments. The application data 702 may be stored in a file system associated with an operating system 418 and served by or used by the application 420. Examples of application data 702 include database tables and those for content include web pages.

Figure 8:
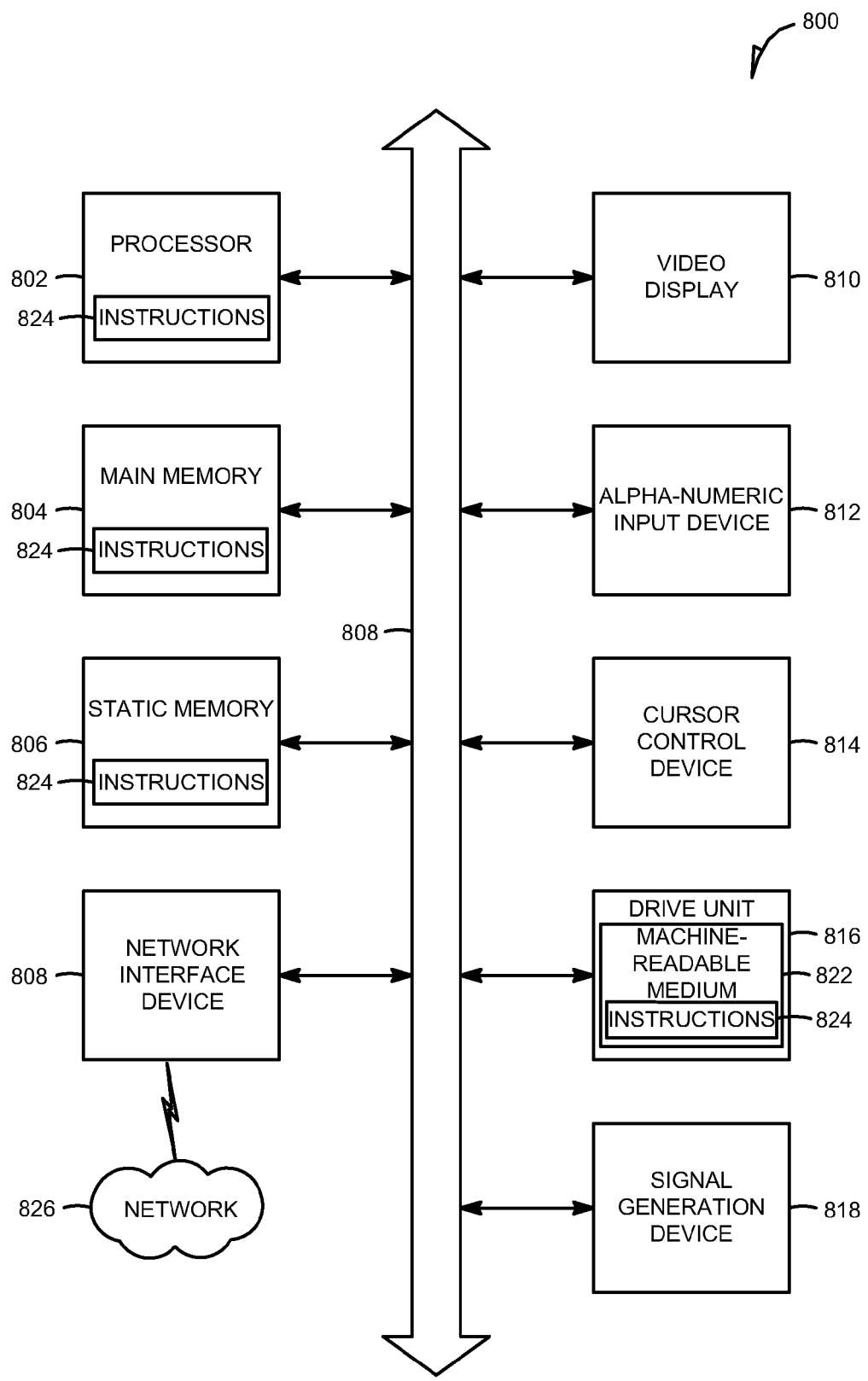
FIG. 8 is a diagrammatic representation of machine within which a set of instructions, for causing the machine to perform any one or more of the methodologies discussed herein, may be executed.

FIG. 8 is a diagrammatic representation of machine within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU) a graphics processing unit (GPU) or both), a main memory 804 and a static memory 806, which communicate with each other via a bus 808. The computer system 800 may further include a video display unit 810 (e.g., a liquid crystal display (LCD) or a cathode ray tube (CRT)). The computer system 800 also includes an alphanumeric input device 812 (e.g., a keyboard), a cursor control device 814 (e.g., a mouse), a disk drive unit 816, a signal generation device 818 (e.g., a speaker) and a network interface device 820.

The disk drive unit 816 includes a machine-readable medium 822 on which is stored one or more sets of instructions (e.g., software 824) embodying any one or more of the methodologies or functions described herein. The software 824 may also reside, completely or at least partially, within the main memory 804 and/or within the processor 802 during execution thereof by the computer system 800, the main memory 804 and the processor 802 also constituting machine-readable media.

The software 824 may further be transmitted or received over a network 826 via the network interface device 820.

While the machine-readable medium 822 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Thus, a method and system to manage a plurality of domain architectures using a model framework have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

Some embodiments described herein may be used to solve one or more technical problems. For example some embodiments may facilitate more efficient resource management and reduce the need to redeploy a system when adding or modifying an architecture domain.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
    defining a plurality of profiles corresponding to a deployment architecture, each profile defined according to a meta-model, the meta-mode, comprising:
        a service object representing a service that is accessible over a network; where, and
        one or more resource objects re-presenting resources consumed by the service, inter-relationships between the service and resources, and inter-relationships between the resources; and
    for each profile,
        generating, using one or more processors, a topology based on the profile, the topology including one or more resources to perform a task; and
        deploying at least one service based on the corresponding topology.

2. The method of claim 1, wherein the meta-model further comprises configuration objects each associated with a resource object of the resource objects, the configuration objects declaring a configuration associated with the resource object.

3. The method of claim 1, wherein the meta-model further comprises performance objects each associated with the resource object, the performance objects declaring a performance metric of the resource object.

4. The method of claim 1, wherein the meta-model further comprises capability objects each associated with the resource object, the capability objects declaring a capability metric of the resource object.

5. The method of claim 1, wherein at least a portion of the profiles are defined according to a base model for the architecture domain and a further architecture domain.

6. The method of claim 1, wherein the service object is associated with a further configuration object, a further performance object, and a further capability object.

7. The method of claim 1, wherein the resource object is a hardware resource or a software resource, or an Internet Protocol (IP) Address, or a Virtual Local Area Network (VLAN), and the hardware and software resource object comprises a plurality of part objects.

8. The method of claim 1, wherein the meta-model comprises a group object, the group object identifying one or more of the resource objects, or one or more of the part objects, the group object having an associated performance object and an associated configuration object.

9. The method of claim 1, further comprising management of the service, by:
    managing a resource of the one or more resources within the topology, the resource corresponding to the resource object, and
    managing a hardware resource corresponding to the resource within the topology based on the profile of the resource within the topology.

10. A system comprising:
    a management system implemented by one or more processors to access one or more profiles of services within a deployment architecture and to generate a topology based on a profile, the profiles defined according to a meta-model, the meta-model comprising:
        a service object representing a service of the services, and
        resource objects representing resources consumed by at least a portion of the services, inter-relationships between the service and resources, and inter-relationships between the resources; and
    a service manager to manage the operational life cycle and service levels of the service, the service corresponding to the deployment architecture, the service manager to dynamically load:
        a controller to manage a resource of the resources within the topology, the resource corresponding to the resource object, and
        an adapter to translate commands from the controller to an instance of the managed resource.

11. The system of claim 10, wherein the meta-model further comprises configuration objects each associated with a resource object of the resource objects, the configuration objects declaring a configuration associated with the resource object.

12. The system of claim 10, wherein the meta-model further comprises performance objects each associated with the resource object, the performance objects declaring a performance metric of the resource object.

13. The system of claim 10, wherein the meta-model further comprises capability objects each associated with the resource object, the capability objects declaring a capability metric of the resource object.

14. The system of claim 10, further comprising a configuration manager to store the one or more profiles and the topology within a memory storage device and to verify a configuration of a resource within the topology.

15. The system of claim 10, further comprising a resource manager to allocate the resources consumed by a service of the services.

16. The system of claim 10, further comprising a micro-kernel to generate and control the service manager.

17. The system of claim 10, wherein the profile is defined according to a base model, the base model comprising of the elements common across deployments architectures and a further collection of elements specific only to a given deployment architecture.

18. The system of claim 17, wherein the meta-model comprises a group object, the group object identifying one or more of the resource objects, the group object having an associated performance object and an associated configuration object.

19. The system of claim 10, wherein the resource instance is in a data center.

20. The system of claim 10, wherein the resource is a hardware resource in a cloud computing environment.

21. The system of claim 10, wherein the resources comprises one or more of a hardware resource, a software resource, a Internet Protocol (IP) address, and a Virtual Local Area Network (VLAN).

22. The system of claim 21, wherein the hardware resources and the software resources further comprise parts.

23. The system of claim 22, wherein the resources corresponding to the hardware resource comprise computing elements, network elements, and storage elements.

24. The system of claim 22, wherein the resources corresponding to the software resource comprise operating systems and applications.

25. A non-transitory computer, readable storage-medium having instructions embodied thereon, the instructions executable by one or more processors to perform operations comprising:
  defining a profile for each of a plurality of deployment architectures, each profile defined according to a meta-model, the meta-model comprising:
    a service object representing a service of the one or more services, and
    a resource object representing a resource consumed by the service, inter-relationships between the resources, or inter-relationships between the resources; and
  for each profile: generating, using one or more processors, a topology based on the profile, the topology including the resources: to perform a task; and
  deploying at least one service based on the corresponding topology.

* * * * *